United States Patent [19]

Swiatlowski et al.

[11] Patent Number: 4,673,078
[45] Date of Patent: Jun. 16, 1987

[54] APPARATUS AND METHOD FOR ASSEMBLING PRODUCT COMBINATIONS

[75] Inventors: George J. Swiatlowski, Fremont; Donald P. Trapp; Duane B. Liescheidt, both of White Cloud; Arden G. McDaniel; Maurice W. Brandt, both of Fremont, all of Mich.

[73] Assignee: Gerber Products Company, Fremont, Mich.

[21] Appl. No.: 880,416

[22] Filed: Jun. 30, 1986

[51] Int. Cl.⁴ .............................................. B65G 47/68
[52] U.S. Cl. ...................................... 198/450; 198/420
[58] Field of Search ............ 198/450, 441, 458, 481.1, 198/420

[56] References Cited

U.S. PATENT DOCUMENTS

| | | | |
|---|---|---|---|
| 2,466,962 | 4/1949 | Weymouth | 198/441 |
| 2,685,993 | 8/1954 | Currivan | 226/14 |
| 3,016,666 | 1/1962 | Whitmore | 53/112 |
| 3,603,445 | 9/1971 | Zausch | 198/441 X |
| 3,606,997 | 9/1971 | Guckel | 21/56 |
| 4,073,372 | 2/1978 | List | 198/458 X |
| 4,225,032 | 9/1980 | Gherardi | 198/481.1 X |

Primary Examiner—Joseph E. Valenza
Assistant Examiner—D. Glenn Dayoan
Attorney, Agent, or Firm—Townsend and Townsend

[57] ABSTRACT

Articles from various sources are arranged in assorted combinations by feeding the articles in individual feed lines according to source to a rotor with outward opening pockets each capable of retaining one full combination. The feed lines meet the rotor periphery along a series of spaced entry points, and a contoured stationary barrier extending into the pockets of the rotor effectively shortens the pockets to a varying degree which recedes in the direction of rotation of the rotor. The result is that each pocket adds only a preselected number (generally one) of articles as it passes each entry point. Upon passing the last entry point, each pocket contains a full assortment of articles which are subsequently ejected from the pocket as a group.

17 Claims, 4 Drawing Figures

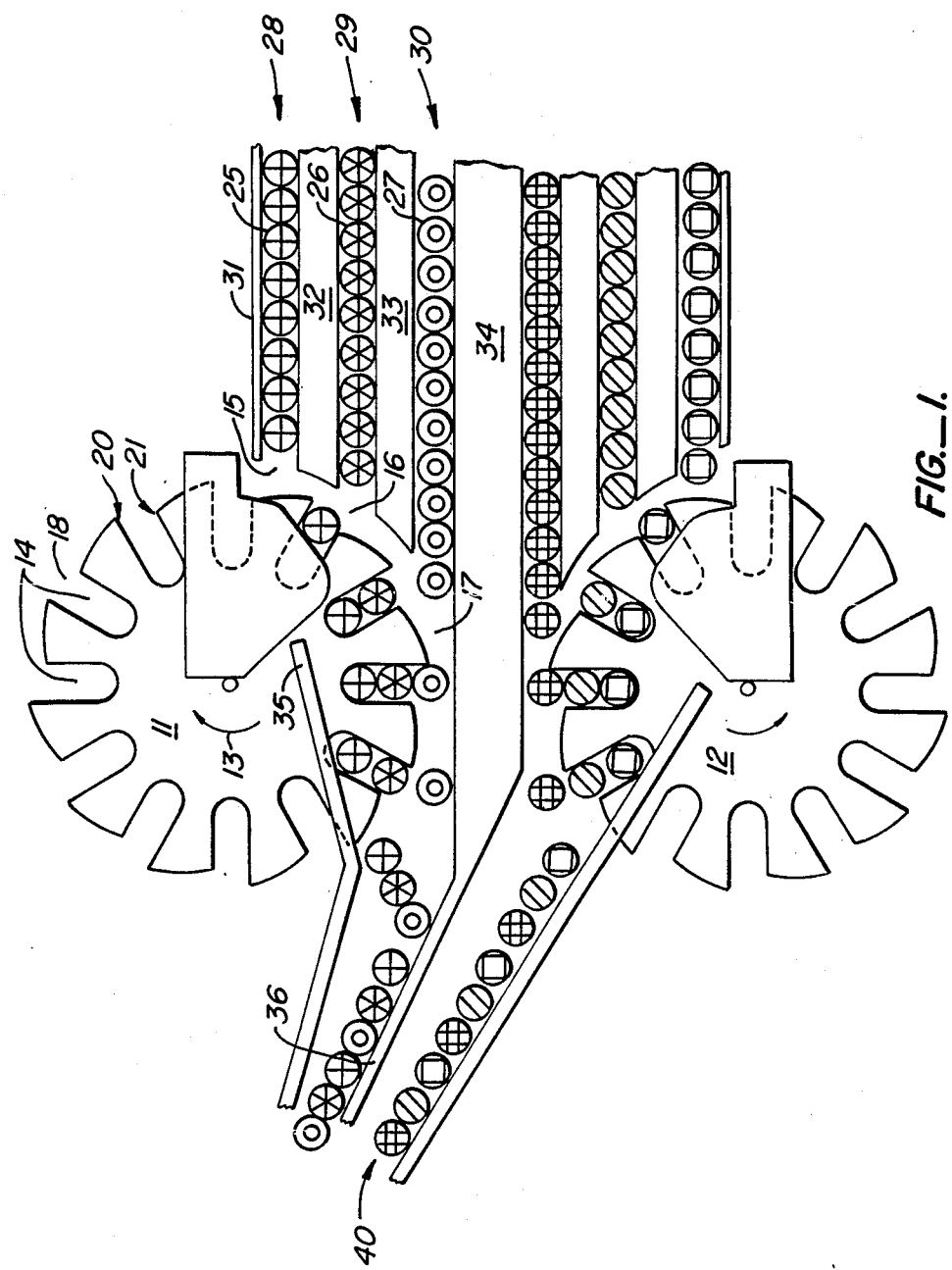
FIG._1.

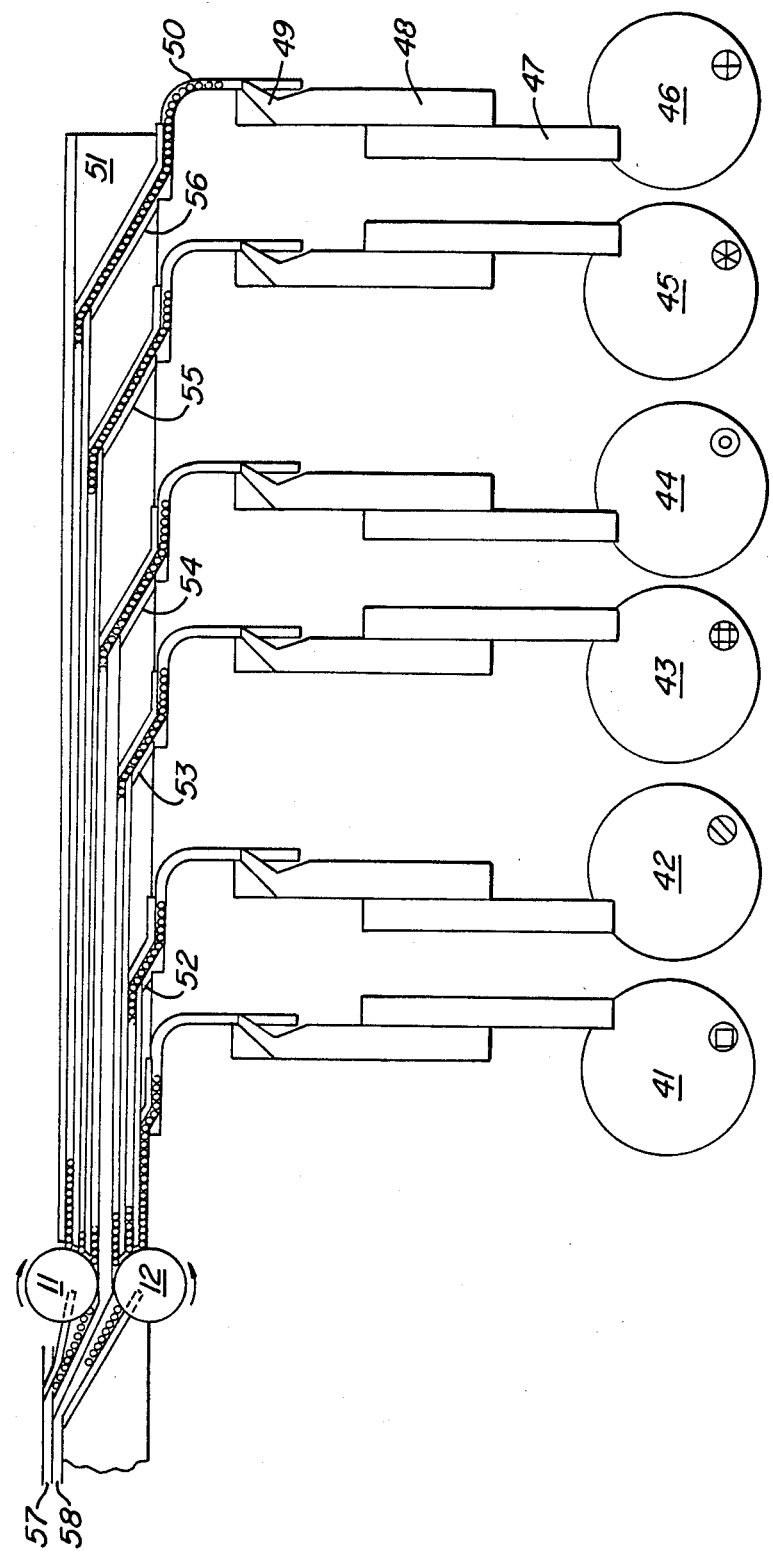
FIG._2.

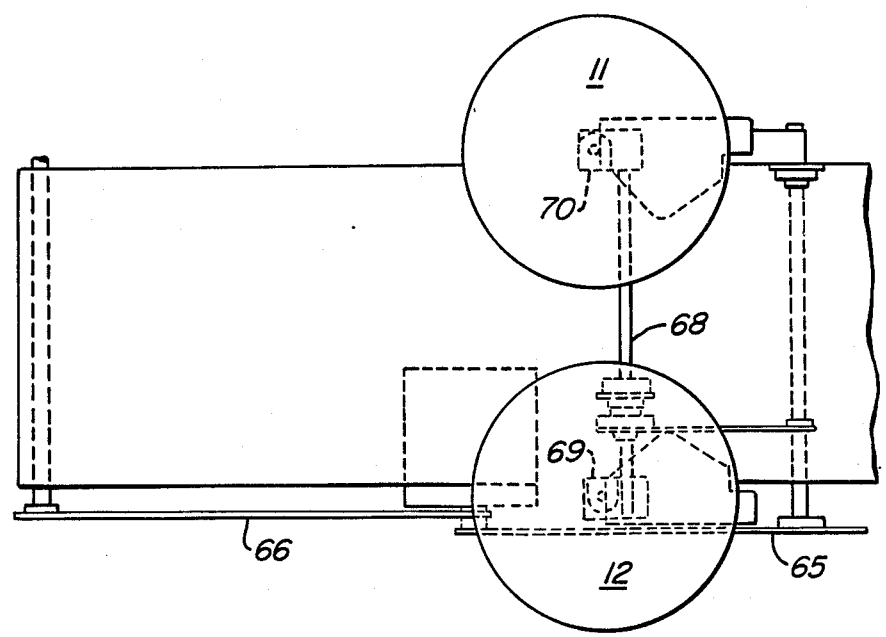
FIG._3a.
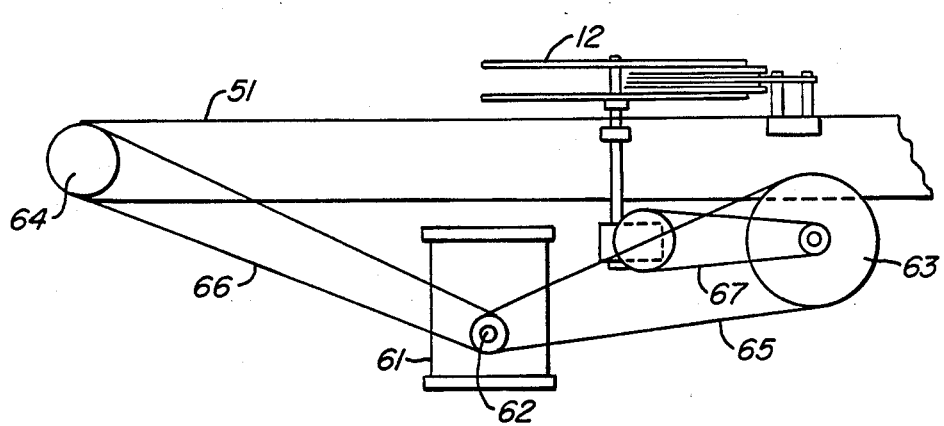
FIG._3b.

APPARATUS AND METHOD FOR ASSEMBLING PRODUCT COMBINATIONS

BACKGROUND AND SUMMARY OF THE INVENTION

This invention relates to product packaging, and particularly to the selecting and combining of products from various sources for combination packaging.

This invention has particular utility in the preparation of multi-product packages such as food items where different flavors, colors, or types are combined to make an assortment in a single package. Examples are beverage six-packs and baby food cartons.

The invention resides in a continuous flow apparatus and method whereby products are drawn from individual sources and combined into groups containing articles from each source for packaging into cartons or containers of appropriate size. This is done by a rotor having pockets along its periphery, the rotor mounted for rotation past a series of fixed points along its periphery at each of which are supplied articles from one of the several sources. A stationary barrier superimposed over the rotor limits the depth to which the articles penetrate into the pockets. The barrier is contoured to increase the permissible penetration depth of each pocket as the rotor rotates, at a rate which permits only a preselected number of articles, preferably one, to enter each pocket at each fixed point. Once a pocket has collected articles from each source, it continues to rotate to a point where the articles are ejected from the pocket as a group and subsequently packaged.

BRIEF DESCRIPTION OF THE DRAWINGS

FIG. 1 is a plan view of one embodiment of the present invention.

FIG. 2 is an extended plan view of the embodiment of FIG. 1, including sources for the various articles and connecting conveyor lines.

FIGS. 3a and 3b are a plan view and side elevation, respectively, of a drive mechanism for the embodiment shown in FIG. 1.

DETAILED DESCRIPTION OF THE DRAWINGS AND THE PREFERRED EMBODIMENTS

FIG. 1 depicts a preferred embodiment of the convention, involving a pair of rotors 11, 12 positioned side by side for rotation in opposite directions. The rotors are mirror images of each and function in identical manner. The rotors are horizontal and coplanar. The following description of the rotor 11 occupying the uppermost position in the drawing applies in reverse to the counterpart elements in the other rotor 12.

The direction of rotation of the rotor 11 is indicated by the curved arrow 13 toward the center of the rotor. A series of pockets 14 extend around the periphery of the rotor, each pocket opening outward to permit articles travelling in the plane of the rotor to enter the pockets. Each pocket is large enough to retain the full number of articles sought to be included in each combination. In this case, each combination will consist of three articles which will then be combined with a second group of three articles from the mirror-image rotor 12. To provide smooth flow of articles into and out of each pocket, the pockets are preferably elongate and radially aligned to hold the articles in a straight line along the radius of the rotor. When only one article from each source is desired, as shown, the width of each pocket is preferably sufficient to accommodate only one article.

As the rotor turns, the pockets pass a series of fixed entry points 15, 16, 17 to which articles from the various sources are fed. As the opening 18 of a given pocket reaches one of these points, an article located at that point is urged into the pocket, preferably by a conveyor chain moving under the articles moving them forward into the rotor. The penetration of the articles into the pockets is limited by a stationary barrier 19 which operates like a stationary cam, contoured to vary the depth of penetration around the rotor in the region of the entry points 15, 16, 17. The barrier recedes further back into the pockets between adjacent entry points, thereby increasing the capacity of the pockets at each entry point and permitting entry of further articles, preferably one at each entry point. In the embodiment shown, the barrier 19 functions as a stop at entry point 15 limiting the capacity of pockets at this point to one article, while at entry point 16, the barrier 19 is partially recessed, permitting pockets passing this point to add a second article. Finally, at entry point 17, the barrier 19 is removed entirely from the pockets permitting them to accept articles up to their full capacity, in this case three.

To facilitate the entry of the articles into the pockets, the opening 18 of each pocket has a tailing edge 20 which extends further out than the leading edge 21. As the rotor rotates and pockets approach the entry points 15, 16, 17, the angled rims 22 between the tailing and leading edges of adjacent pockets permits articles between the pockets to advance gradually forward toward the center of the rotor. When a pocket reaches an entry point, the protruding portion of the tailing edge 20 then engages the article immediately, preventing slippage of articles between adjacent pockets.

The articles to be assembled into combinations are shown as distinctive individual types 25, 26, 27 kept separate from each other in individual feed lanes 28, 29, 30 which direct the articles to the various entry points 15, 16, 17. The articles are moved toward these entry points by conventional means, such as conveyor belts, which also urge the articles into the pockets 14 once they have passed the pocket openings 18. It is preferred to use a table top conveyor chain (not shown in the drawing) spanning the width of all lanes 28, 29, 30, moving to the left in the arrangement shown in the drawing. The space above the conveyor chain on the approaching side of the rotor (i.e., the right side) is divided by partitions 31, 32, 33, 34 defining the lanes. Preferably, the lanes are of appropriate width to confine the articles to a single file in each lane as shown.

The fixed entry points may be distributed anywhere along the rotor periphery on the side at which the belt approaches the rotor (i.e., the right half in the embodiment shown in the drawing). It is preferred, however, that the entry points be limited to the region shown in the drawing, i.e., the 90° arc of the periphery between the point where the conveyor belt approaches the rotor along the rotor radius (the 3 o'clock position) and the point where the belt approaches the rotor tangentially (the 6 o'clock position).

Once a pocket has passed this tangential point (and has picked up articles from each source), the pocket contains the desired combination of articles. The combination is then retrieved from the pocket at a point or region further along in the direction of rotation. In the embodiment shown, the point is approximately midway along the 90° arc at the lower left of the rotor (the 7 o'clock to 8 o'clock position). Removal of the articles from pockets in this region may be achieved by the same conveyor chain used to feed the articles to the rotor, by continuing this conveyor chain underneath and past the rotor. As the angle of the pocket rotates gradually from perpendicular with respect to the chain (the six o'clock position) to parallel (the nine o'clock position), the motion of the chain draws the articles toward the left out of the pockets. The articles may be further urged out of the pockets by a second stationary barrier 35 which gradually shortens the pocket from the interior outward as the rotor turns, pushing the articles out. The articles then continue along the moving conveyor chain in their combinations in the reverse order in which they entered the pockets. An angled barrier 36, angled with respect to the direction of motion of the conveyor chain, arranges the emerging articles in a single file, keeping their order intact. The articles are then removed from this single file in groups of three for packaging.

The second rotor 12 is the mirror image of the first, and rotates in the opposite direction. Groups of articles from three additional sources are formed in the pockets of this second rotor and ejected in a manner similar to the first to form a second single file 40 adjacent to the single file emerging from the first rotor 11. Groups of three may then be simultaneously removed from both product lines to be placed directly in six-packs.

The invention may range from a single rotor up to several. The two-rotor arrangement shown in the figure is particularly useful, however, for forming assorted six-packs.

A feed arrangement for the rotors is shown in FIG. 2. Here, articles are drawn from six sources, the sources designated 41, 42, 43, 44, 45 and 46. These may be elevating and rotating pallet tables, for example, or any containment structure from which articles may be removed by continuous machinery. In this embodiment, the articles are drawn out from the pallet tables by skate conveyors 47 leading to chain conveyors 48. Tapered channels 49 at the end of the chain conveyors 48 reduce the article flow to single files which are deposited on side flex conveyors 50 which transport the articles to a wide chain conveyor 51 on which they are directed to flow in parallel lines. This wide chain conveyor 51 is the same conveyor that passes underneath the rotors 11, 12. Partitions 52, 53, 54, 55 and 56, angled with respect to the direction of motion of the wide chain conveyor 51, direct the articles to the appropriate lanes, spanning the width of the conveyor 51. At the downstream end (extreme upper left of drawing) the articles emerge in two parallel lanes 57, 58 from which the articles may be removed in a uniform assorted six-pack arrangement.

The apparatus may be driven by conventional means. An illustrative arrangement is shown in FIGS. 3a and 3b. Here, an AC motor 61 through its rotating shaft 62 drives two wheels 63 and 64 by respective belts or roller chains 65, 66. One wheel 64 drives the wide chain conveyor 51 which carries the articles to and from the rotors. The other wheel 63 connects to a third belt 67 to rotate a shaft 68 passing beneath both rotors. Right angle gear drives 69, 70 at each end of the shaft 68 mesh with gears at the base of each rotor, mounted so as to drive the rotors in opposite directions. Further details of construction and operation will be readily apparent to those skilled in the art.

The foregoing description is offered primarily for purposes of illustration. It will be readily apparent to those skilled in the art that numerous modifications and variations may be made from the features of structure and operation described herein without departing from the spirit and scope of the invention.

What is claimed is:

1. Apparatus for assembling articles from a plurality of sources into combinations containing one article from each source, said apparatus comprising:
    a rotor having a plurality of pockets along its periphery opening outward;
    means for conveying articles from said sources into said pockets at fixed entry points spaced apart along said periphery, one said fixed entry point for each said source;
    a stationary barrier limiting the penetration of said articles into said pockets to a depth increasing in the direction of rotation of said rotor to permit addition to each said pocket of one article at each said fixed entry point; and
    means for retrieving said combinations from said pockets at a fixed location past the last of said fixed entry points.

2. Apparatus in accordance with claim 1 in which the openings of said pockets are sized to limit entry therein to one said article at a time.

3. Apparatus in accordance with claim 1 in which the tailing edges of the openings of said pockets extend further from the center of said rotor than the leading edges of said openings.

4. Apparatus in accordance with claim 1 in which said conveying means and said retrieving means are comprised of a common conveyor belt of sufficient width to span all said fixed entry points.

5. Apparatus in accordance with claim 1 in which said conveying means is comprised of a conveyor belt and at least one partition dividing the space above said conveyor belt into a plurality of lanes, one leading to each said fixed entry point.

6. Apparatus in accordance with claim 5 in which said conveyor belt passes beneath said rotor in continuous contact with said articles.

7. Apparatus in accordance with claim 5 in which said fixed entry points are located along a 90° arc of said periphery between points where said conveyor belt approaches said rotor radially and tangentially, respectively.

8. Apparatus in accordance with claim 1 in which said retrieving means is comprised of a second stationary barrier limiting the depth of pockets rotated past the last of said fixed entry points and contoured to push said articles outward as said rotor rotates.

9. Apparatus in accordance with claim 1 further comprising:
    a second rotor having a plurality of pockets along its periphery opening outward, said second rotor positioned adjacent to and coplanar with said rotor;
    means for rotating said rotor and said second rotor in opposite directions;
    means for conveying articles from further said sources into the pockets of said second rotor at a second series of fixed entry points along the periphery thereof, one said fixed entry point for each said source;

a second stationary barrier limiting the penetration of articles into the pockets of said second rotor to a depth increasing in the direction of rotation thereof to permit addition of one article to each said pocket at each fixed entry point of said second series; and means for retrieving the contents of the pockets of said second rotor at a fixed location past the last fixed entry point of said second series.

10. Apparatus for assembling articles from a plurality of sources into combinations containing one article from each source, said apparatus comprising:

a rotor having a plurality of pockets along its periphery opening outward, the tailing edges of said pockets extending further outward than the leading edges thereof;

a conveyor belt passing beneath said rotor with extended upstream and downstream portions;

at least one partition above said upstream portion of said conveyor belt, dividing the space above said upstream portion into a plurality of lanes, each said lane communicating one of said sources with a corresponding fixed entry point on the periphery of said rotor; and a stationary barrier limiting the penetration of said articles into said pockets to a depth increasing in the direction of rotation of said rotor to permit addition to each said pocket of one article at each said fixed entry point.

11. Apparatus in accordance with claim 10 in which said lanes are sized to form said articles into a single file.

12. Apparatus for assembling articles from a plurality of sources into combinations containing one article from each source, said apparatus comprising:

first and second coplanar rotors, each having a plurality of pockets along its periphery opening outward;

a conveyor belt passing beneath both rotors in a direction substantially perpendicular to the line connecting the centers thereof, said conveyor belt being sufficiently wide to span the distance between said centers and having extended upstream and downstream portions;

a plurality of partitions in the space above said upstream portion of said conveyor belt, dividing said space into a plurality of lanes communicating said sources individually with a plurality of fixed entry points distributed along the peripheries of both said rotors; and first and second stationary barriers limiting the penetration of said articles into said pockets of said first and second rotors, respectively, to depths increasing in the direction of rotation of each said rotor to permit addition of one article to each said pocket upon passing each said fixed entry point.

13. Method for assembling articles from a plurality of sources into combinations containing one article from each source, said method comprising:

(a) feeding articles from each of said sources to discrete feed locations along the periphery of a rotor having a plurality of pockets along its periphery opening outward;

(b) rotating said rotor past a stationary barrier limiting the depth of penetration of said articles into said pockets and contoured to permit the addition of at most one said article to each said pocket as said pocket passes each said feed location; and (c) retrieving the contents of each said pocket at a fixed exit location past the last of said feed locations in the direction of rotation.

14. Method in accordance with claim 13 in which step (a) comprises placing said articles on a conveyor belt moving beneath a plurality of partitions defining lanes isolating said articles according to source, each said lane opening into one of said feed locations.

15. Method in accordance with claim 13 in which step (c) comprises depositing said pocket contents on a conveyor belt passing underneath said rotor moving outward from said exit location.

16. Method in accordance with claim 13 in which step (c) comprises rotating said rotor past a second stationary barrier contoured to push said articles outward as said rotor rotates.

17. Method for assembling articles from a plurality of sources into combinations containing one article from each source, said method comprising:

(a) depositing said articles on a conveyor belt in isolated lanes according to source;

(b) passing said conveyor belt under a rotor having pockets opening outward along its periphery to engage said articles, whereby said lanes meet said rotor periphery at fixed entry locations spaced apart along said periphery;

(c) rotating said rotor past a first stationary barrier limiting the depth of penetration of said articles into said pockets and contoured to permit the addition of at most one said article to each said pocket as said pocket passes each said fixed entry location; and (d) rotating said rotor past a second stationary barrier beyond said first stationary barrier, said second stationary barrier contoured to push said articles out of said pockets as said rotor rotates.

* * * * *